United States Patent [19]
Seifert, Jr.

[11] 3,838,871
[45] Oct. 1, 1974

[54] DRAFT IMPLEMENT TORQUE HINGE
[76] Inventor: Edwin A. Seifert, Jr., Rt. 1, Box 22, Belgrade, Mont. 58714
[22] Filed: Oct. 12, 1973
[21] Appl. No.: 406,093

Related U.S. Application Data
[63] Continuation-in-part of Ser. No. 256,129, May 23, 1972, Pat. No. 3,784,229.

[52] U.S. Cl. .............................. 280/446 R, 172/677
[51] Int. Cl. ................................................ B60d 1/06
[58] Field of Search ............ 280/446, 405 R, 405 B; 172/677

[56] References Cited
UNITED STATES PATENTS

| | | | |
|---|---|---|---|
| 2,480,387 | 8/1949 | Smith | 280/497 X |
| 3,032,903 | 5/1962 | Ede | 172/445 X |
| 3,275,341 | 9/1966 | Ralston | 280/460 A |
| 3,580,612 | 5/1971 | Pearson | 280/446 B X |
| 3,784,229 | 1/1974 | Seifert | 280/446 R |

*Primary Examiner*—Leo Friaglia
*Attorney, Agent, or Firm*—Clarence A. O'Brien; Harvey B. Jacobson

[57] ABSTRACT

A hinge connection between a draft implement and its towing tongue allowing the forward end of the tongue to swing up and down about a horizontal transverse axis relative to the draft implement. The hinge connection further includes structural features whereby increasing downward forces are applied to the front end of the tongue in response to increasing forward pulling forces on the draft implement by the towing tongue.

6 Claims, 4 Drawing Figures

PATENTED OCT 1 1974  3,838,871

3,838,871

DRAFT IMPLEMENT TORQUE HINGE

This application comprises a continuation-in-part of my copending U.S. application Ser. No. 256,129 for TORQUE HINGE FOR DRAFT MEMBER, filed May 23, 1972 and now U.S. Pat. No. 3,784,229.

The torque hinge of the instant invention has been designed primarily to enable increasing amounts of the weight of the forward end of a draft implement to be applied to the forward end of the associated towing tongue in response to increases in forward pulling force on the draft implement by the tongue. In this manner, when increased resistance to forward movement of the draft implement is encountered additional downward forces on the driving wheels of the towing vehicle are applied thereby affording the towing vehicle additional traction. Further, the additional downward forces on the towing tongue front end are applied by downward swinging movement of the front end of the towing tongue relative to the draft implement. In this manner, the forward portion of the draft implement is raised relative to the portion of the towing vehicle to which the towing tongue is secured. By this function the operating depth of a ground working tool carried by the draft implement is reduced so as to effect a reduction in the resistance to forward movement of the draft implement.

The main object of this invention is to provide a hinge connection between a draft implement and its associated towing tongue which will, in response to increases in the resistance to forward movement of the draft implement result in the forward end of the towing tongue being swung downwardly relative to the draft implement so as to apply a downward thrust on the rear driving wheels of the associated towing vehicle.

Another object of this invention, in accordance with the immediately preceding object, is to provide a hinge construction which will be operative to raise the forward end of the associated draft implement in relation to the point of the towing vehicle to which the draft tongue is secured in response to increases in resistance to forward movement of the draft implement so as to thereby reduce the operating depth of ground working elements carried by the draft implement.

A still further object of this invention is to provide a torque hinge in accordance with the preceding objects that may be readily incorporated into existing draft implements and also implements presently being manufactured.

Yet another object of this invention is to provide a hinge construction between a draft implement and its towing tongue which will be capable of absorbing substantial vertical forces.

Still another object of this invention is to provide a torque hinge in accordance with the immediately preceding object and which may be readily rendered inoperative so as to provide a substantially rigid connection between the associated draft implement and towing tongue.

A final object of this invention to be specifically enumerated herein is to provide a torque hinge in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
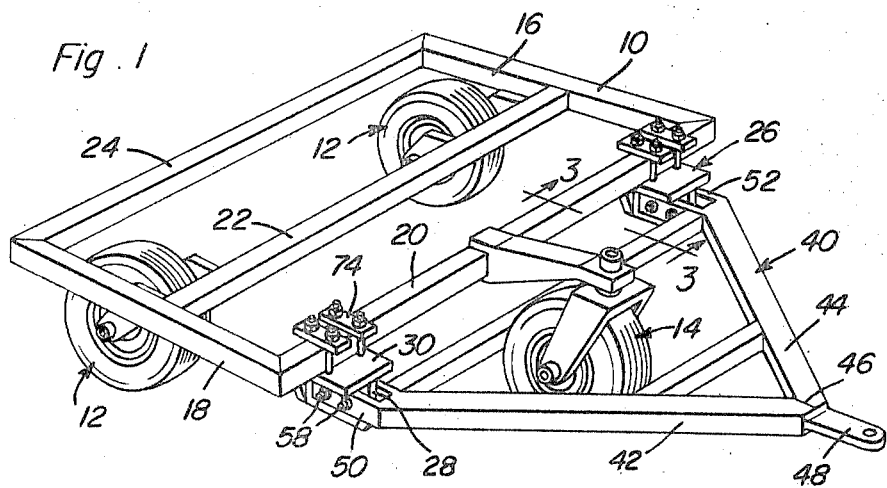
FIG. 1 is a perspective view of a conventional form of draft implement wheeled support frame provided with a towing tongue coupled to the implement frame by means of the torque of the instant invention.

Referring now more specifically to the drawings, the numeral 10 generally designates a draft implement frame of conventional design including opposite side rear ground engaging support wheel assemblies 12 and a forward dirigible-type ground engaging support wheel assembly generally referred to by the reference numeral 14. The frame 10 includes opposite side members 16 and 18 between which front, rear and intermediate cross members 20, 22 and 24, respectively extend. The wheel assembly 14 is supported from the front transverse member 20 and the wheel assemblies 12 are supported from the intermediate transverse member 22. The wheel assemblies 12 and 14 may be vertically adjustable and the forward corner portions of the frame 10 include mounting brackets referred to in general by the reference numeral 26. The mounting brackets 26 include a forwardly projecting anchor plate 28 having a horizontal longitudinal flange 30 secured along its upper edge portion. In addition, a V-shaped bracing plate 32 is secured to and depends downwardly from the rear edge of the flange 30 and is also secured to the rear edge of the anchor plate 28.

Each anchor plate 28 includes a rear horizontal longitudinal slot 34 and a forward upstanding arcuate slot 36. The vertical mid-portion of the horizontal slot 34 is disposed in a horizontal plane extending generally through the vertical mid-portion of the slot 36 and the center of curvature of the slot 36 is disposed rearwardly of the latter and at an elevation spaced at least slightly below the horizontal mid-portion of the slot 34.

A towing tongue is generally referred to by the reference numeral 40 and includes a pair of opposite side towing arms 42 and 44 convergent toward their forward ends and joined together as at 46. The forward extremity of the towing tongue 40 includes a hitch element 48 for attachment to a towing vehicle and the rear ends of the arms 42 and 44 include bifurcated portions 50 and 52 which extend longitudinally of the frame 10 and parallel each other. The bifurcated portions 50 and 52 each include transversely spaced formations 54 having aligned horizontal transverse bores 56 formed therein. Each pair of furcations 54 embracingly receive the corresponding anchor plate 28 therebetween.

A journal pin 58 is secured through each pair of aligned bores 56 and includes a diametrically enlarged head 60 on one end and a transverse diametric bore formed through the other end through which a keeper pin 62 is secured. Each pin 58 includes a longitudinal blind bore 64 which opens end-wise outwardly through the corresponding head 60 and has a greased fitting 66 secured in its outer end and the inner end of each bore 64 opens into a transverse diametric bore 68 extending through the longitudinal mid-portion of the journal pin 58. A bearing sleeve 70 is disposed on each journal pin 58 between the corresponding furcations 54 and is snugly received through the corresponding slot 34, 36.

Figure 3:
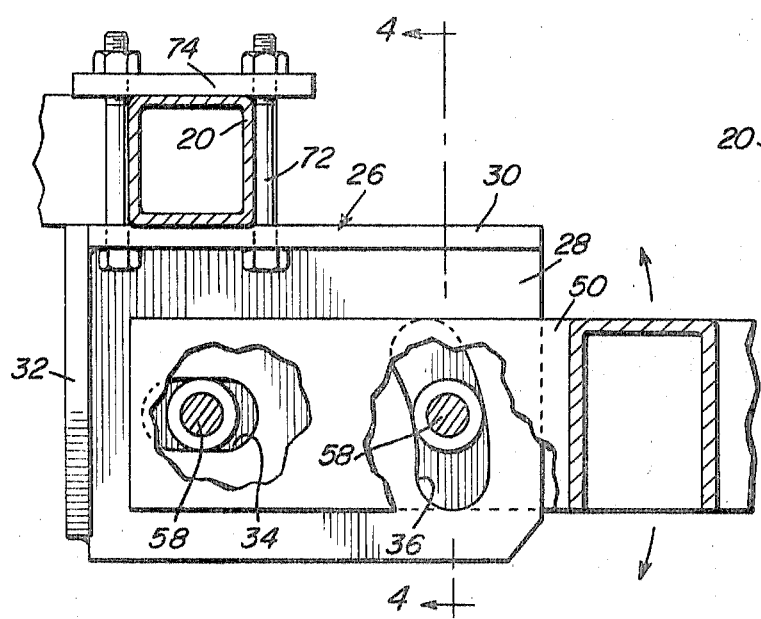
FIG. 3 is a fragmentary enlarged longitudinal vertical sectional view of the implement support frame and towing tongue with portions of the towing tongue being broken away to more clearly illustrate the structural details of the torque hinge.
Figure 4:
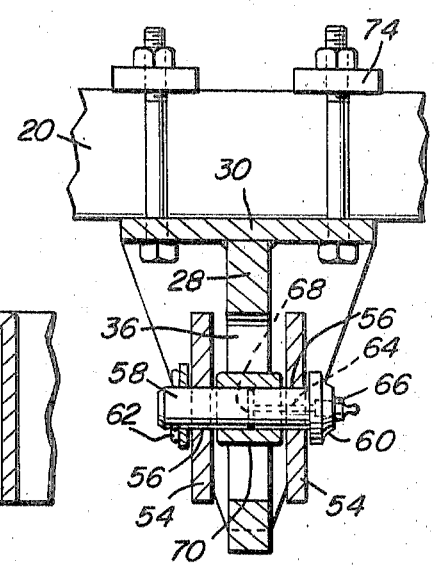
FIG. 4 is a transverse vertical sectional view taken substantially upon the plane indicated by the section line 4—4 of FIG. 3.

From FIGS. 1, 3 and 4 of the drawings it will be seen that the flanges 30 are secured to the undersurface portions of the opposite ends of the forward transverse member 20 by means of tension fasteners 72 in the form of threaded nuts and bolts and bridging plates 74 extending over the opposite ends of the front transverse member 20 and through which the upper ends of the bolt portions of the tension fasteners 72 are secured by means of the nut portions thereof.

Figure 2:
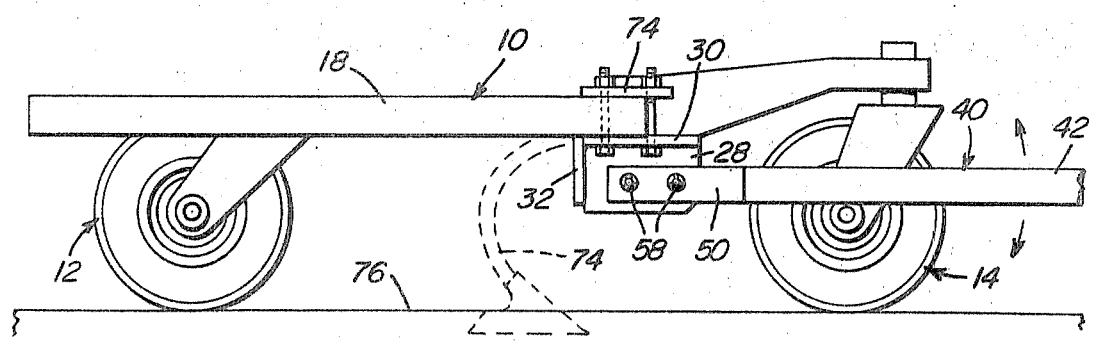
FIG. 2 is an enlarged fragmentary side elevational view of the assemblage illustrated in FIG. 1 and with a ground working element carried by the implement frame illustrated in phantom lines.

In FIG. 2 of the drawings a ground working implement 74 is dependingly supported from the front transverse member 20 and engaged with the ground 76 upon which the wheel assemblies 12 and 14 rest. The working depth of the implement 74 is determined according to its position in relation to the lower peripheral portions of the wheels assemblies 12 and 14.

When the towing tongue 40 is secured to a draft vehicle (not shown) and forward movement of the frame 10 meets with increasing resistance to movement of the element 74 through the ground 76, the additional forward pull on the frame 10 by the tongue 40 necessary to maintain forward movement of the frame 10 causes the sleeves 70 on the forward pins 58 to be cammed downwardly in the slots 36 and the sleeves 70 on the rear pins 58 to slide forwardly in the slots 34. This of course swings the forward end of the tongue 40 downwardly relative to the frame 10. However, inasmuch as the forward end of the tongue 40 is attached to the associated towing vehicle (not shown) at a fixed elevation relative to that vehicle, instead of the forward end of the tongue being urged downwardly, the forward end of the frame 10 is cammed upwardly so as to transfer some of the weight of the forward end of the frame 10 ordinarily supported by the wheel assembly 14 to the forward end of the tongue 40 thereby affording the rear traction wheels of the towing vehicle (not shown) greater traction. In addition, upward swinging of the forward end of the frame 10 serves to counter the tendency for ground resistance acting upon the element 74 to cause the forward end of the frame to drop and resists the ground working elements 74 from penetrating deeper than their desired working depth so as to prevent the wheel assembly 14 from being urged downwardly into the ground 34, thus reducing resistance to forward movement of the frame 10.

The horizontal slot 34 is provided as a means to enable greater vertical shock loads to be transferred between the frame 10 and the towing tongue 40. In addition, any suitable means may be operatively connected between the frame 10 and a forward portion of the tongue 40 in order to prevent angular displacement of the tongue 40 relative to the frame 10, if desired. By utilizing a rear horizontal slot instead of a forwardly and upwardly inclined arcuate slot such as that disclosed in my copending U.S. application Ser. No. 256,129, more simplified structure may be utilized to lock the towing tongue 40 against angular displacement relative to the frame 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a draft implement frame including front and rear portions, an elongated tongue, coacting means supporting one end portion of said tongue from said front portion of said frame with said tongue projecting generally horizontally forwardly of said frame, said coacting means including means supporting said tongue from said frame for relative angular displacement of the tongue to raise and lower the front end thereof relative to the frame, said coacting means including means operative to apply increasing downward forces on the forward end of said tongue in response to increasing forward pulling force on said frame by said tongue, said coacting means defining a pair of front and rear pin and slot connections between said frame and tongue spaced longitudinally of the latter and in general horizontal alignment with each other, the slot portion of one of said pin and slot connections comprising an upstanding arcuate slot with its concave side opening toward the other slot and including a portion thereof opening in a slightly downwardly inclined direction in which the pin portion of said one pin and slot connection is disposed when said elongated is generally horizontally disposed, the slot portion of the other of said pin and slot connections comprising a substantially horizontally front to rear extending slot.

2. The combination of claim 1 wherein said one pin and slot connection comprises the front pin and slot connection.

3. The combination of claim 1 wherein the horizontal slot portion of the other of said pin and slot connection is disposed in a horizontal plane extending generally through the vertical mid-portion of the upstanding arcuate slot of said one pin and slot connection.

4. In combination, a draft implement frame including front and rear portions, an elongated tongue, coacting means supporting one end portion of said tongue from said front portion of said frame with said tongue projecting generally horizontally forwardly of said frame, said coacting means including means supporting said tongue from said frame for relative angular displacement of the tongue to raise and lower the front end thereof relative to the frame, said coacting means including means operative to apply increasing downward forces on the forward end of the tongue in response to increasing forward pulling force on said frame by said tongue, opposite side forward portions of said frame including upstanding parallel longitudinally extending anchor plate portions, said tongue including rearwardly divergent arms joined together at their forward ends, the rear ends of said arms including bifurcated portions receiving the corresponding plate portions between the furcations thereof, each of said plate portions and the corresponding furcations including coacting means defining a pair of front and rear pin and slot connections between said plate and the corresponding furcations spaced longitudinally of the plate and in generally horizontal alignment with each other, the slot portion of one of said pin and slot connections comprising an upstanding arcuate slot with its concave side opening toward the other slot and including a portion thereof opening in a slightly downwardly inclined direction in which the pin portion of said one pin and slot connection is disposed when said elongated tongue is generally horizontally disposed, the slot portion of the other of said pin and slot connections comprising a front to rear extending horizontal slot.

5. The combination of claim 4 wherein said one pin and slot connection comprises the forward pin and slot connection.

6. The combination of claim 1 wherein the pins of said pin and slot connections, when said tongue is generally horizontally disposed, are disposed generally centrally intermediate the opposite ends of said slots.

* * * * *